(12) United States Patent
O'Neal

(10) Patent No.: US 12,084,102 B1
(45) Date of Patent: Sep. 10, 2024

(54) METHODS AND SYSTEMS FOR MOVING A ROLL OF TURF END FIRST

(71) Applicant: Jason O'Neal, El Mirage, AZ (US)

(72) Inventor: Jason O'Neal, El Mirage, AZ (US)

( * ) Notice: Subject to any disclaimer, the term of this patent is extended or adjusted under 35 U.S.C. 154(b) by 0 days.

(21) Appl. No.: 18/370,096

(22) Filed: Sep. 19, 2023

Related U.S. Application Data

(60) Provisional application No. 63/449,868, filed on Mar. 3, 2023.

(51) Int. Cl.
*B62B 3/10* (2006.01)
*B62B 3/02* (2006.01)
*B62B 3/04* (2006.01)

(52) U.S. Cl.
CPC ............... *B62B 3/104* (2013.01); *B62B 3/02* (2013.01); *B62B 3/04* (2013.01); *B62B 2202/03* (2013.01); *B62B 2301/044* (2013.01)

(58) Field of Classification Search
CPC ....... B62B 3/102; B62B 3/104; B62B 5/0083; B62B 2202/03; B62B 2207/02; B62B 2205/06
See application file for complete search history.

(56) References Cited

U.S. PATENT DOCUMENTS

| | | | | |
|---|---|---|---|---|
| 2,019,256 A | * | 10/1935 | Dutton | B62B 1/24 280/47.24 |
| 2,171,068 A | | 8/1939 | Masters | |
| 2,702,139 A | * | 2/1955 | Faustine | B66C 19/02 248/58 |
| 3,638,815 A | * | 2/1972 | Fincher | A47F 7/175 414/458 |
| 3,647,237 A | * | 3/1972 | Milton | B62B 3/04 254/8 R |
| 3,702,139 A | * | 11/1972 | Chaffin | B62B 3/104 414/349 |
| 3,887,095 A | | 6/1975 | Suzuki | |
| 4,084,763 A | * | 4/1978 | Zamboni | A01G 20/18 242/399.1 |
| 4,119,210 A | * | 10/1978 | Desourdy | B62D 61/10 414/467 |

(Continued)

FOREIGN PATENT DOCUMENTS

| | | | | |
|---|---|---|---|---|
| BR | 9712828-7 | | 11/1997 | |
| CN | 107458445 A | * | 12/2017 | B62B 3/102 |

OTHER PUBLICATIONS

Translation of CN-107458445-A (Year: 2017).*

*Primary Examiner* — Katy M Ebner
(74) *Attorney, Agent, or Firm* — Etherton Law Group, LLC

(57) ABSTRACT

A device and method for moving a turf roll end first through a narrow gate. A turf roll mover has a front cradle and a rear cradle, connectable by a connector bar. The connector bar is used to lever the turf roll onto the turf roll mover and to connect the front and rear cradles. Each cradle has four wheels and tires suited for driving over the ground with relatively low friction. To move the turf roll onto the mover, the connector bar is inserted into the one end of the turf roll and used as a lever to lift that end onto the front cradle, then inserted into the other end of the turf roll to lift that end onto the rear cradle. The connector bar is placed into a receiver on the front cradle and into a receiver on the rear cradle to connect the cradles.

20 Claims, 9 Drawing Sheets

(56) References Cited

U.S. PATENT DOCUMENTS

| | | | | |
|---|---|---|---|---|
| 4,174,849 A * | 11/1979 | Wetzel | ............... | B62B 1/22 |
| | | | | 280/47.3 |
| 4,212,478 A * | 7/1980 | McGrath, Jr. | ......... | B62B 3/008 |
| | | | | 248/129 |
| 4,295,777 A * | 10/1981 | Bell | ............... | B62B 3/04 |
| | | | | 414/458 |
| 4,321,004 A * | 3/1982 | Mills | ............... | B62B 1/264 |
| | | | | 414/559 |
| 4,333,617 A * | 6/1982 | Hamilton | ............... | E04D 15/06 |
| | | | | 254/8 R |
| 4,496,179 A * | 1/1985 | Ogle | ............... | B65G 7/12 |
| | | | | 294/26 |
| 4,824,313 A * | 4/1989 | Miller | ............... | B62B 3/10 |
| | | | | 414/361 |
| 5,129,462 A | 7/1992 | Mail | | |
| 5,219,175 A * | 6/1993 | Woelfel | ............... | B60B 33/0023 |
| | | | | 280/47.131 |
| 5,234,240 A * | 8/1993 | Richard | ............... | B65G 7/12 |
| | | | | 294/4 |
| 5,456,566 A * | 10/1995 | Kniley | ............... | B62B 3/102 |
| | | | | 280/79.6 |
| 5,524,415 A * | 6/1996 | Pachinger | ............... | B65H 18/04 |
| | | | | 414/444 |
| 6,071,061 A * | 6/2000 | Monnin | ............... | B62B 1/20 |
| | | | | 242/597 |
| 6,099,001 A * | 8/2000 | Barresi | ............... | B62B 3/10 |
| | | | | 280/79.6 |
| 6,109,856 A * | 8/2000 | Mings | ............... | B62B 5/0083 |
| | | | | 414/490 |
| 6,209,893 B1 * | 4/2001 | Ferris | ............... | B62B 5/0083 |
| | | | | 280/47.131 |
| 6,270,133 B1 * | 8/2001 | Babcock | ............... | B65G 7/12 |
| | | | | 294/26 |
| 7,389,996 B2 * | 6/2008 | Dube | ............... | B62B 3/104 |
| | | | | 280/638 |
| 7,862,093 B2 * | 1/2011 | Stiltner | ............... | B65G 7/10 |
| | | | | 294/15 |
| 8,025,595 B2 * | 9/2011 | Henning | ............... | A63C 19/12 |
| | | | | D6/592 |
| 8,360,459 B2 | 1/2013 | Holtan | | |
| 8,919,476 B2 * | 12/2014 | Holland | ............... | B62D 12/02 |
| | | | | 180/167 |
| 8,944,445 B2 * | 2/2015 | Cook | ............... | B60B 33/00 |
| | | | | 280/79.6 |
| 9,057,224 B1 * | 6/2015 | Cogburn, Jr. | ............... | B25J 1/04 |
| 9,061,697 B2 * | 6/2015 | Veronie | ............... | B62B 5/0086 |
| 9,669,855 B2 * | 6/2017 | Elliott | ............... | B62B 5/06 |
| 10,266,095 B1 | 4/2019 | Berg | | |
| 11,679,794 B2 * | 6/2023 | Greenblatt | ............... | B62B 5/067 |
| | | | | 280/33.998 |
| 2002/0110446 A1 * | 8/2002 | Smith | ............... | B66F 9/18 |
| | | | | 414/607 |
| 2003/0038438 A1 * | 2/2003 | Maarten Van Oosten | ............... | |
| | | | | B62B 1/262 |
| | | | | 280/79.6 |
| 2003/0145969 A1 | 8/2003 | Mielonen | | |
| 2004/0213657 A1 * | 10/2004 | Bennett | ............... | B60P 1/5409 |
| | | | | 414/542 |
| 2022/0081017 A1 * | 3/2022 | Stranahan | ............... | B62B 3/102 |
| 2023/0030848 A1 | 2/2023 | Buckland | | |

* cited by examiner

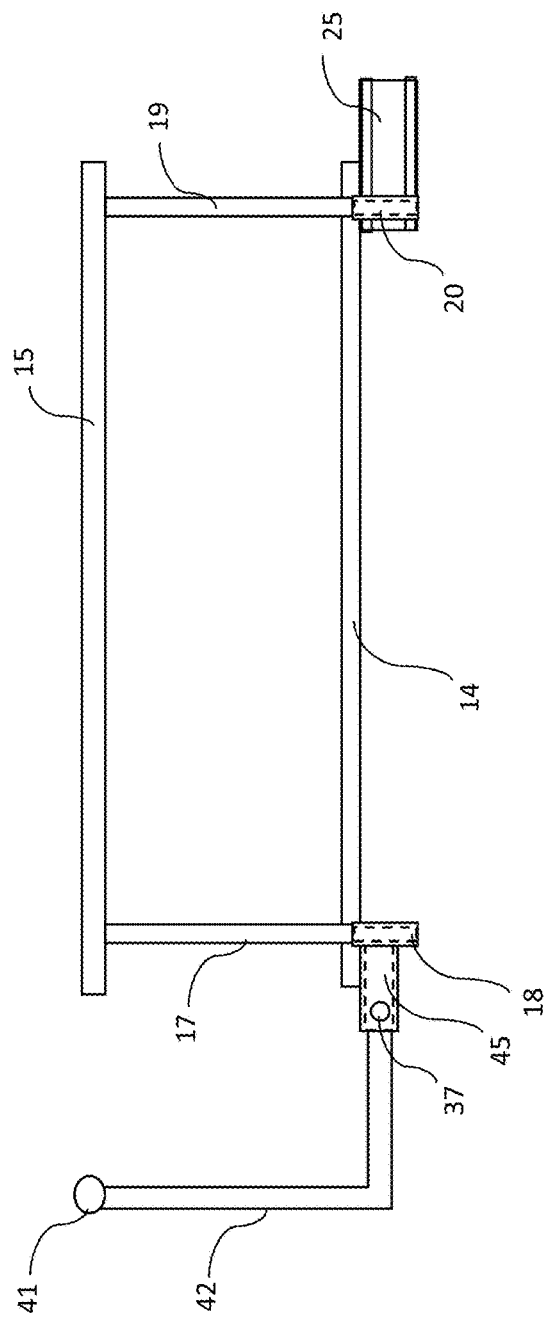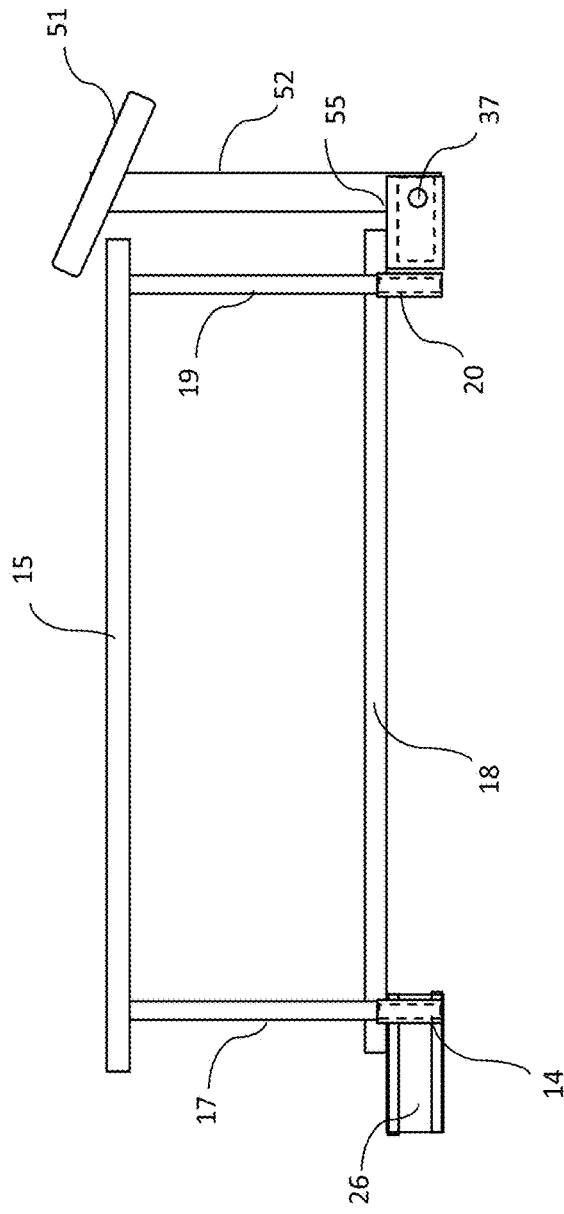

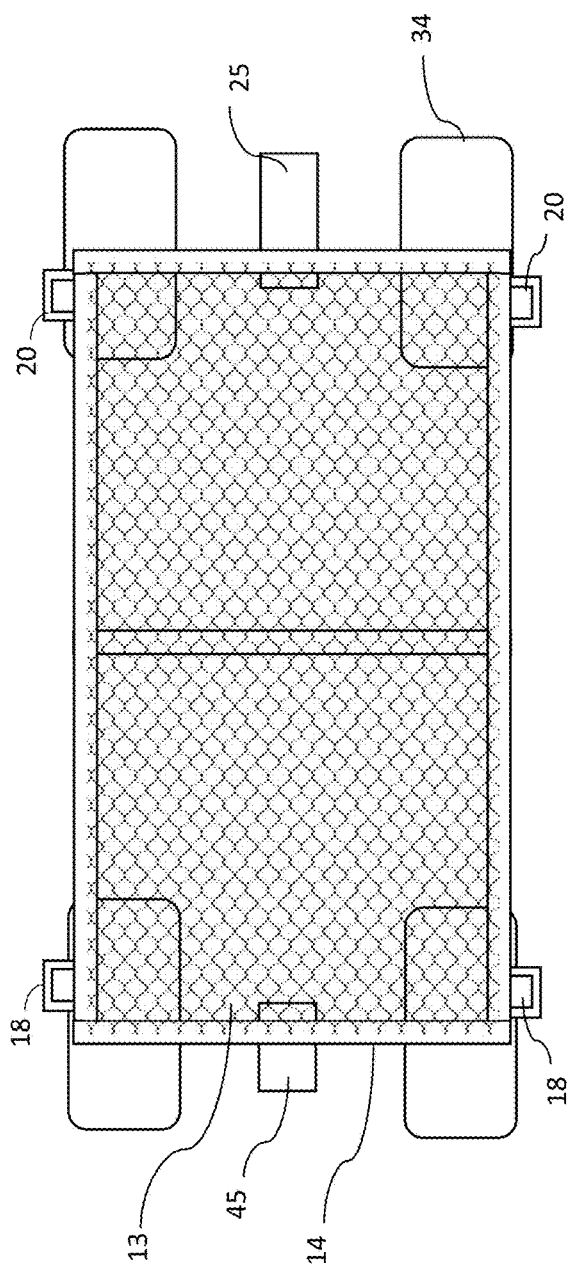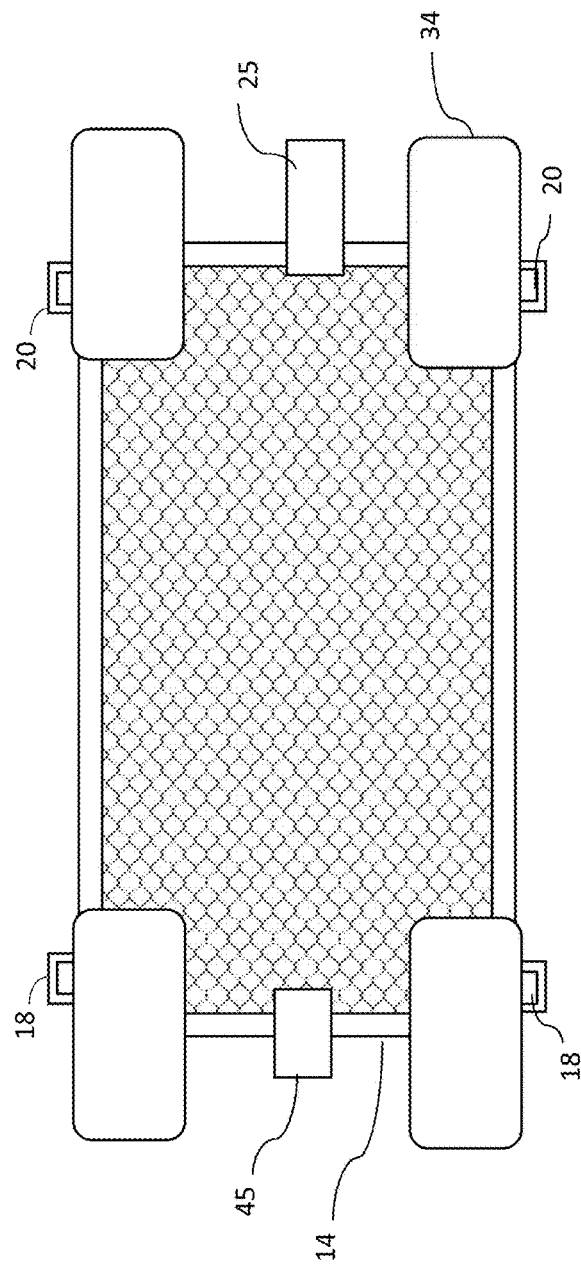

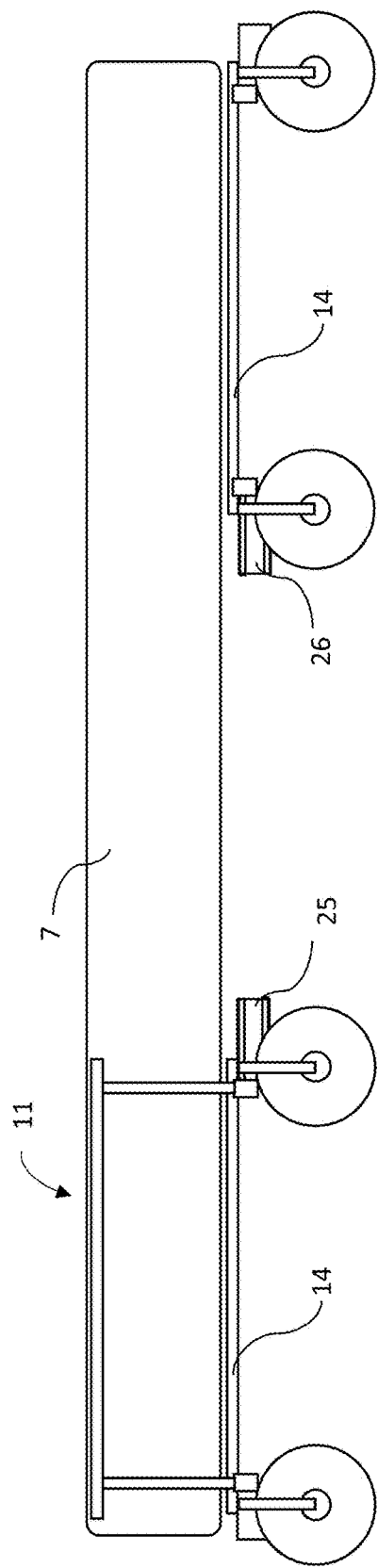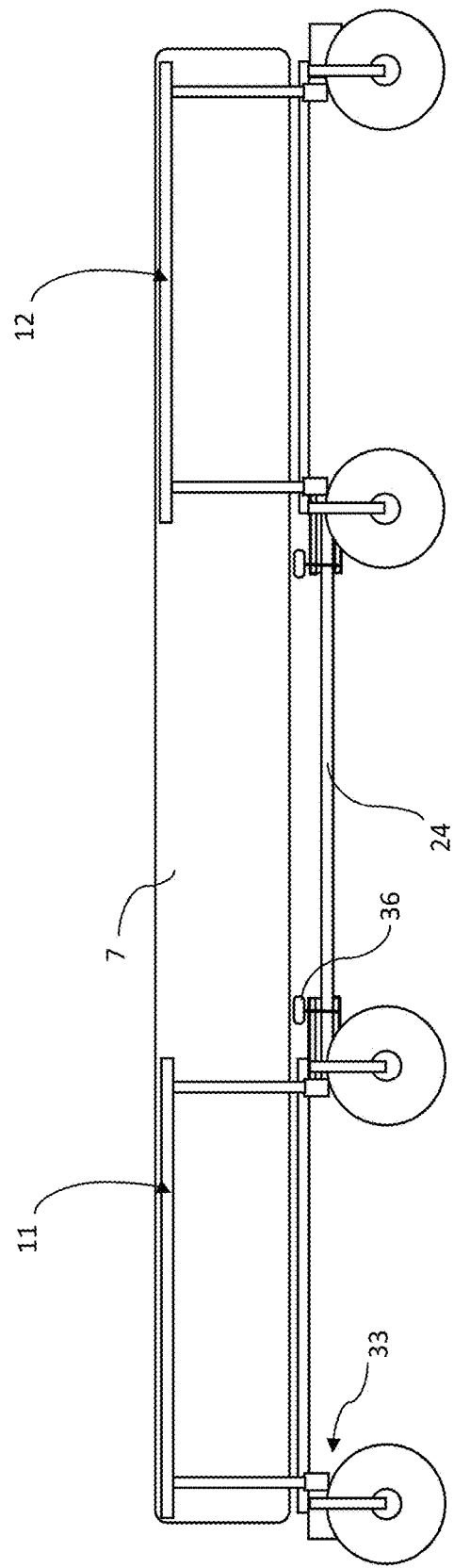

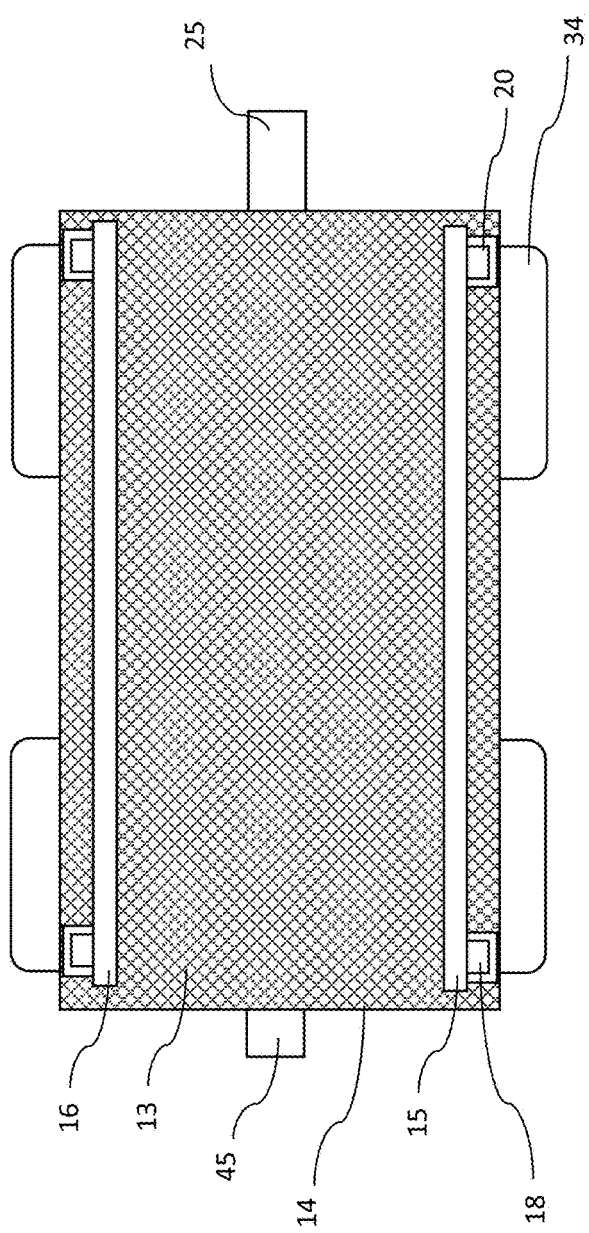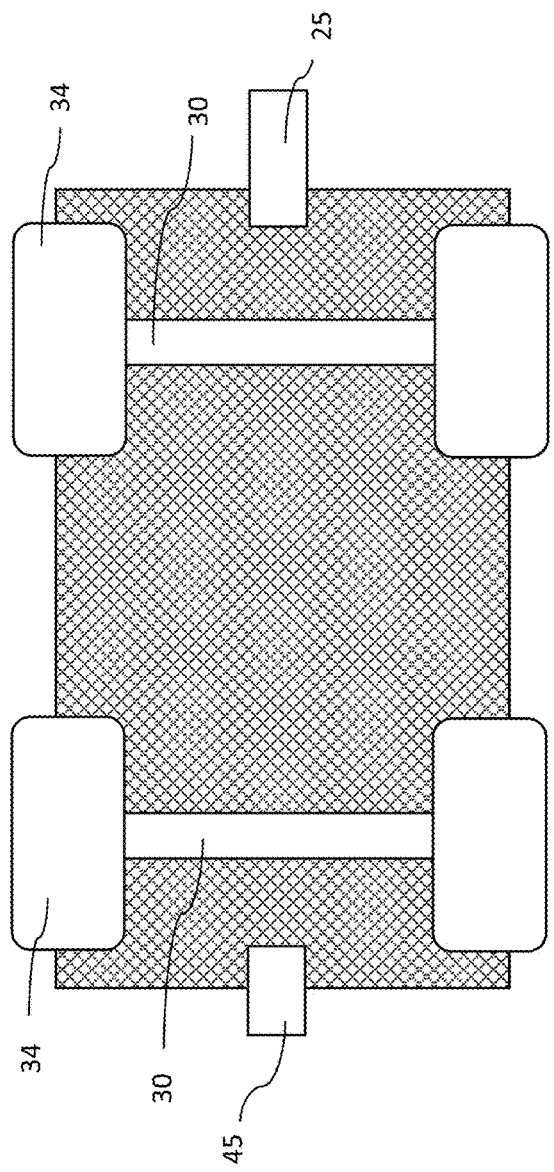

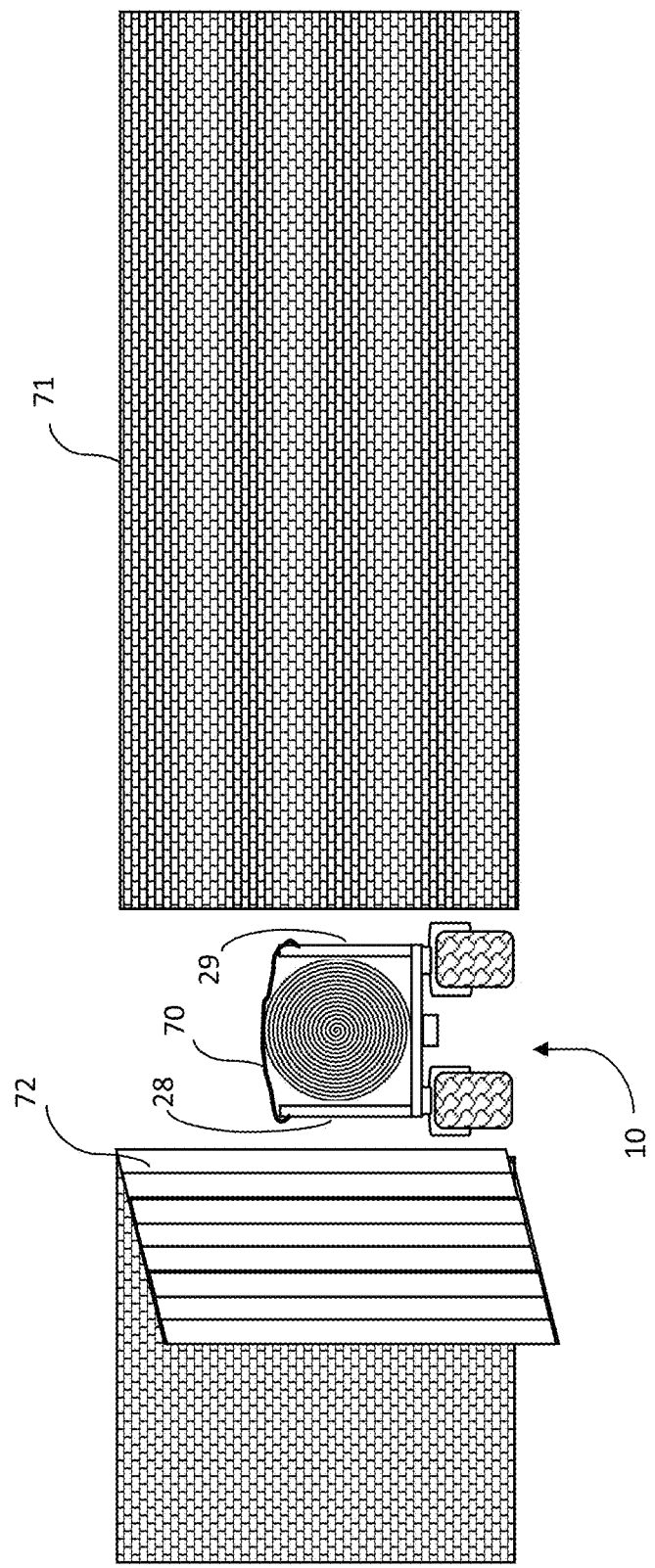

METHODS AND SYSTEMS FOR MOVING A ROLL OF TURF END FIRST

CROSS-REFERENCE TO RELATED APPLICATIONS

This application claims the benefit of U.S. Provisional Application No. 63/449,868 filed Mar. 3, 2023.

FIELD OF INVENTION

This invention relates generally to moving heavy rolls of artificial turf. This invention relates specifically to a device and methods of using it which enable one or two people to move a heavy roll of artificial turf end first without heavy machinery.

BACKGROUND

Artificial turf has typically been used in stadiums and on large playing fields as a surface cover for certain athletic events, such as football and baseball games. The turf is generally manufactured in relatively large strips, typically on the order of 15 feet wide and 200 feet long, and weighing from 3,500 to 4,000 lbs. When rolled, it forms a roll approximately 5 feet in diameter and 15 feet long. Skid-steer loaders, cranes, and other heavy machinery are used to transport, pick up, move, wind, and unwind the roll for large commercial applications.

Recently, artificial turf is increasingly being used in residential yards and commercial building patio areas, in part because it replaces natural grass that requires water and regular upkeep. Turf rolls for residential and commercial patio areas are also manufactured in large strips, again on the order of 15 feet wide. The length of the strips varies depending on the area in the yard or patio area where it is being installed and can be custom ordered. Commonly a strip of artificial turf for residential or commercial patio use is 50 feet long. When rolled, it forms a roll approximately 3-4 feet in diameter, 15 feet long and weighing 800-1500 lbs. It is too heavy for a few people to carry or easily move.

For backyard and patio applications the turf roll is delivered by heavy equipment, such as a trailer with a lift, crane, or a skid steer, to the front yard or front area of a commercial building. The turf roll then often has to be brought in through a gate or other opening that is narrower than the roll is long. For example, backyard man gates are typically about 4 ft wide, and backyard RV gates are often less than 15 ft wide. That means the turf roll needs to be turned such that it can move through the gate, with the spiral end going through the gate first. Unfortunately, the skid-steers and other heavy equipment that are strong enough to deliver and move turf rolls are too wide to drive through a backyard gate opening. Even if they were narrow enough to make it through the gate, because they carry the turf roll crosswise to the gate the turf roll is too wide to fit though the opening. It would be desirable to manually move a roll of turf through a man-sized opening such as a man gate or residential man door.

In addition to being too wide and carrying the load oriented in a way that won't fit though backyard gates, skid-steers and other heavy equipment have to be transported on a trailer to the location where the turf will be laid. They are motorized vehicles, which require gas, maintenance, and training to operate. It would be desirable to manually move a roll of turf into a backyard without motorized heavy equipment.

One method of manually moving a roll of turf into a backyard is to lay several lengths of PVC pipe on the ground parallel to each other to form a makeshift roller conveyor. The turf roll is shoved off the trailer it is delivered on and dropped onto the makeshift conveyor. People push the roll lengthwise across the PVC pipes. As the turf roll moves past a pipe in the rear, that pipe is moved to the front of the line of pipes, all the while trying to keep the turf roll headed in the right direction. The time and physical effort this method takes is nearly overwhelming, often taking a team of several people longer to move the turf roll into place than to actually install the turf. Another disadvantage of this method is that as the roll is conveyed towards the gate is crosswise to the gate and has to be turned 90 degrees such that the end of the roll can be maneuvered through the gate.

It would be desirable to have a device that enables just one or a few people to move a heavy roll of artificial turf. It would be desirable to manually move a roll of turf into a backyard without motorized heavy equipment. It would also be desirable to have a device that moves the turf roll end first so that it can be moved through a man gate or man door.

SUMMARY OF THE INVENTION

A device and method are provided for moving a turf roll end first through a narrow gate. The turf roll mover has a front cradle and a rear cradle which are connectable by a connector bar. The front and rear cradles each have four wheels. The wheels can be attached individually to the cradles as casters or in pairs on axles mounted to the cradles. The tires on the wheels are suited for driving over gravel and dirt with relatively low friction. The front and rear cradles each have removable side supports. Optionally there is a removable pull handle on the front cradle and a removable push bar on the rear cradle, or both.

The connector bar is removable. To move the turf roll onto the mover, the connector bar is inserted into the core on one spiral end of the turf roll. It is then used as a lever to lift that end onto the front cradle, leaving the other end of the turf roll on the ground. The connector bar is removed from that now-loaded front spiral end and inserted into the core on the other spiral end of the turf roll. Again, the connector is used as a lever to lift that end onto the rear cradle. The connector bar is then placed into a front connector bar receiver on the front cradle and into a rear connector bar receiver to connect the cradles. Optionally the connector bar is secured into the connector bar receivers with a fastener.

The turf roll is moved to the location where it is to be installed by manually pulling the loaded mover from the front and pushing it from the rear. Alternatively, an electric motor can be used to drive the wheels on the rear cradle. Because the spiral end of the turf roll leads, the roll can be moved through a narrow gate. When the turf mover reaches the desired location, the side railings or panels are removed and the turf roll is rolled off the mover onto the ground.

The turf roll mover can be disassembled into its constituent parts and stacked in a pickup truck bed or trailer pulled behind a pickup.

BRIEF DESCRIPTION OF THE DRAWINGS

FIG. 3 is a side view of the front cradle without the wheels of the first embodiment of a turf roll mover.

FIG. 4 is a side view of the rear cradle without the wheels of the first embodiment of a turf roll mover.

FIG. 5 is a top view of the front cradle of the first embodiment of a turf roll mover.

FIG. 6 is a bottom view of the front cradle of the first embodiment of a turf roll mover.

FIG. 7 is a side view of a turf roll mover loaded with a roll of turf before the rear side support or connector bar have been placed on the turf roll mover.

FIG. 8 is the turf roll mover of FIG. 7 with the rear side support and connector bar secured in place.

FIG. 11 is a top view of the front cradle of the second embodiment of a turf roll mover.

FIG. 12 is a bottom view of the front cradle of the second embodiment of a turf roll mover.

FIG. 17 illustrates a loaded turf roll mover moving through a backyard man gate.

DETAILED DESCRIPTION OF THE INVENTION

Figure 1:
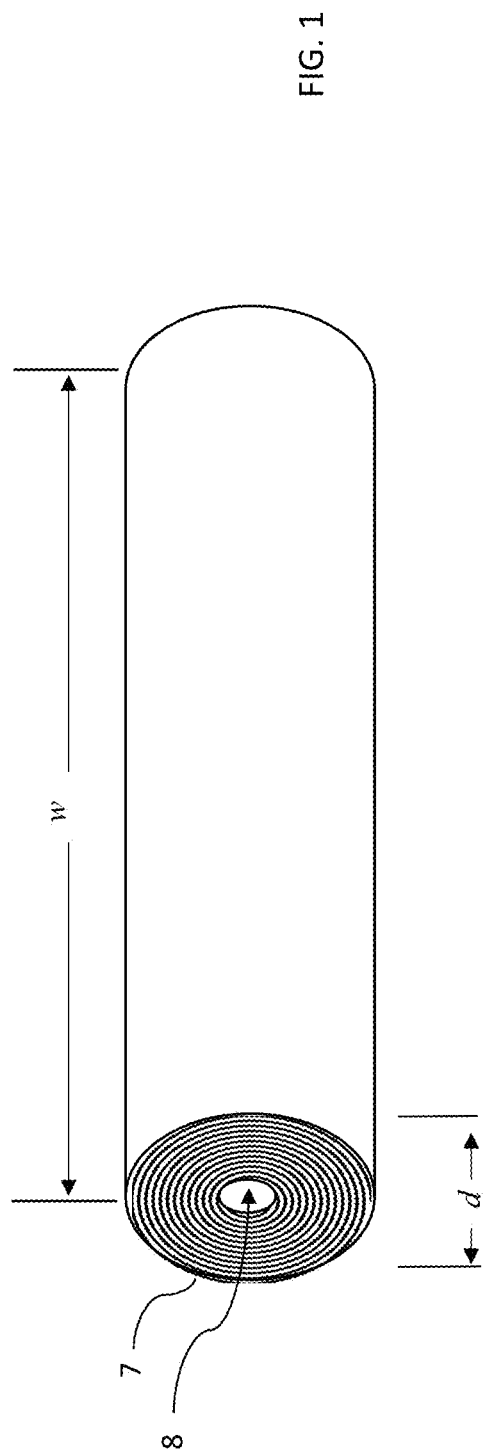
FIG. 1 is a perspective view of a roll of turf.

Commonly a strip of artificial turf for residential or commercial patio use is 15 feet wide and 50 feet long. When rolled, it forms a roll approximately 3-4 feet in diameter, 15 feet wide and weighing 800-1500 lbs. FIG. 1 shows a roll of artificial turf 7 having a width w and a diameter d. It is too heavy for a few people to carry or easily move by hand.

The turf roll mover 10 has a front cradle 11 and a rear cradle 12. See FIGS. 2-4 and 7-10. The front and rear cradles each have at least four wheels 32. The tires 34 on the wheels are suited for driving over gravel and dirt with relatively low friction, as explained in more detail below. The front and rear cradles 11, 12 each have a base 14, preferably made of steel. The base 14 is a rectangular frame, optionally with supporting cross beams. In some embodiments the base has a solid piece of metal or wood fitted in the frame. In some embodiments a mesh 13 of steel or fabric covers the base 14 to allow landscape debris to fall through the holes; the steel mesh weighs less than what a solid base would weigh. See FIGS. 5, 6, 11 and 12. Each base 14 has two side supports connectable to the base to keep the turf roll from rolling off the cradles when loaded. The side supports can be side rails 15, 16 or side panels 28, 29. At least one of the side supports is removable from the base so that a turf roll can be loaded from the side of the cradle instead of only from the end of the cradle. See FIGS. 3, 4, 9, and 10. The side rails are preferably made of steel and the side panels are preferably made of made of wood.

To connect the side supports to the base, each removable side support has two posts 17, 19 that fit in two post receivers 18, 20 on each side of the base. The post receivers may be attached to the side of the base, as shown in FIGS. 2-8, or on top of the base, as shown in FIGS. 9-13. Each post receiver is preferably closed at the end nearer the ground, by swage or metal welded to the bottom, to keep the post from falling through the post receiver. Alternatively one or more of the side supports may instead be hinged to the base to fold down to permit the turf roll to be loaded from the side of the cradle.

The front cradle 11 has a front connector bar receiver 25 on its rear end and optionally a handle receiver 45 on its front end. The handle receiver 45 is configured to receive an optional pull handle 40. The pull handle 40 has a grab bar 41 and a neck 42 that may be fixedly or pivotally connected to a coupler bar 44 that fits into the handle receiver 45. The pull handle 40 is held in place in the pull handle receiver 45 with a fastener that allows the pull handle 40 to be easily removed, such as a cotter pin that fits into a hole 37 in the pull handle receiver 45. The connector bar receiver 25 is configured to receive a connector bar 24, as discussed more below.

Figure 2:
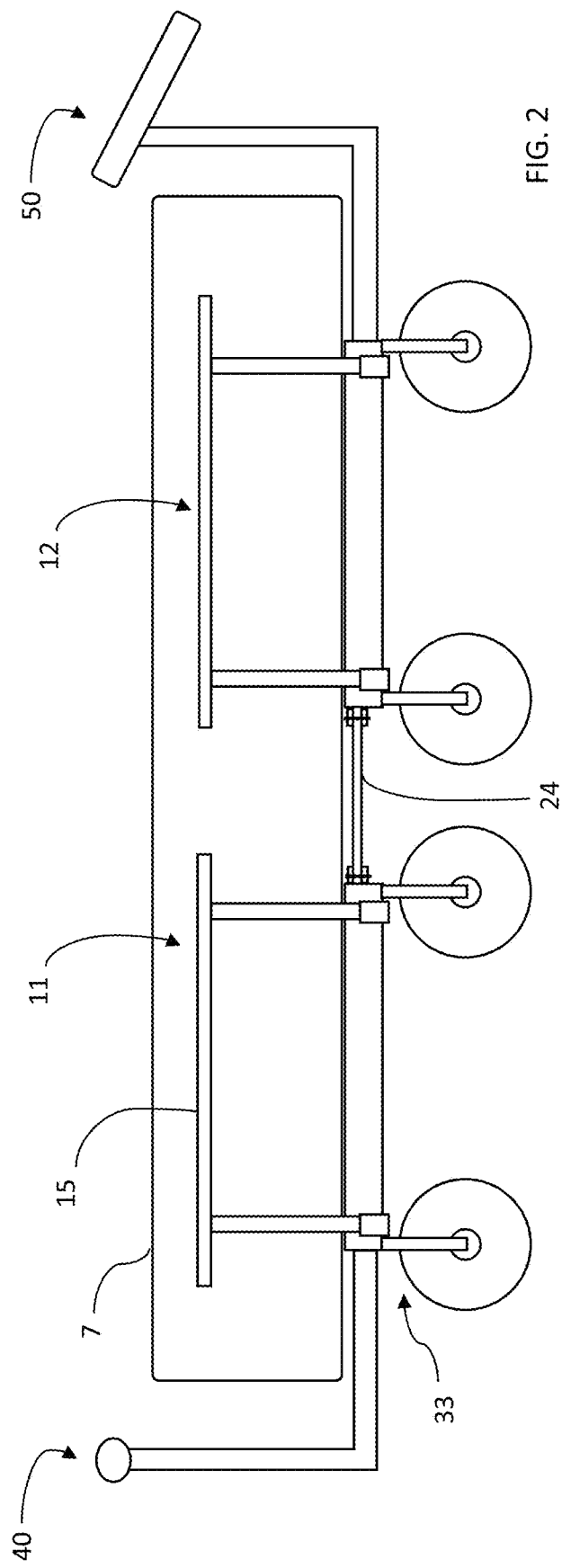
FIG. 2 is a side view of a first embodiment of a turf roll mover loaded with a turf roll.
Figure 9:
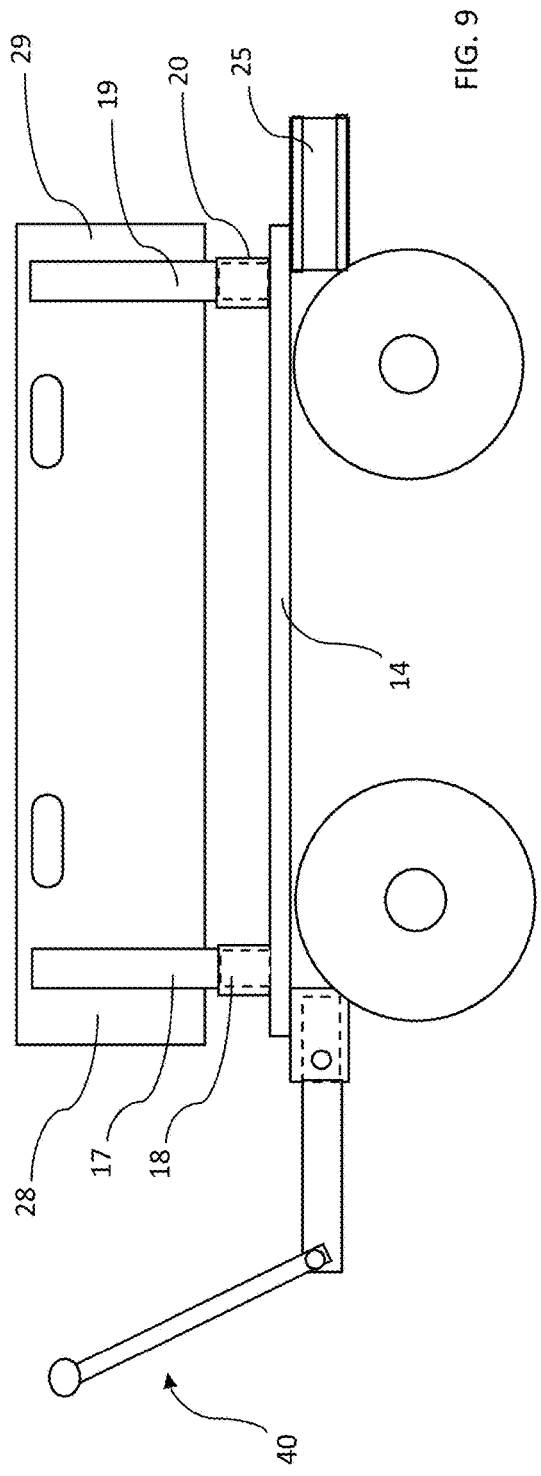
FIG. 9 is a side view of the front cradle of a second embodiment of a turf roll mover.
Figure 10:
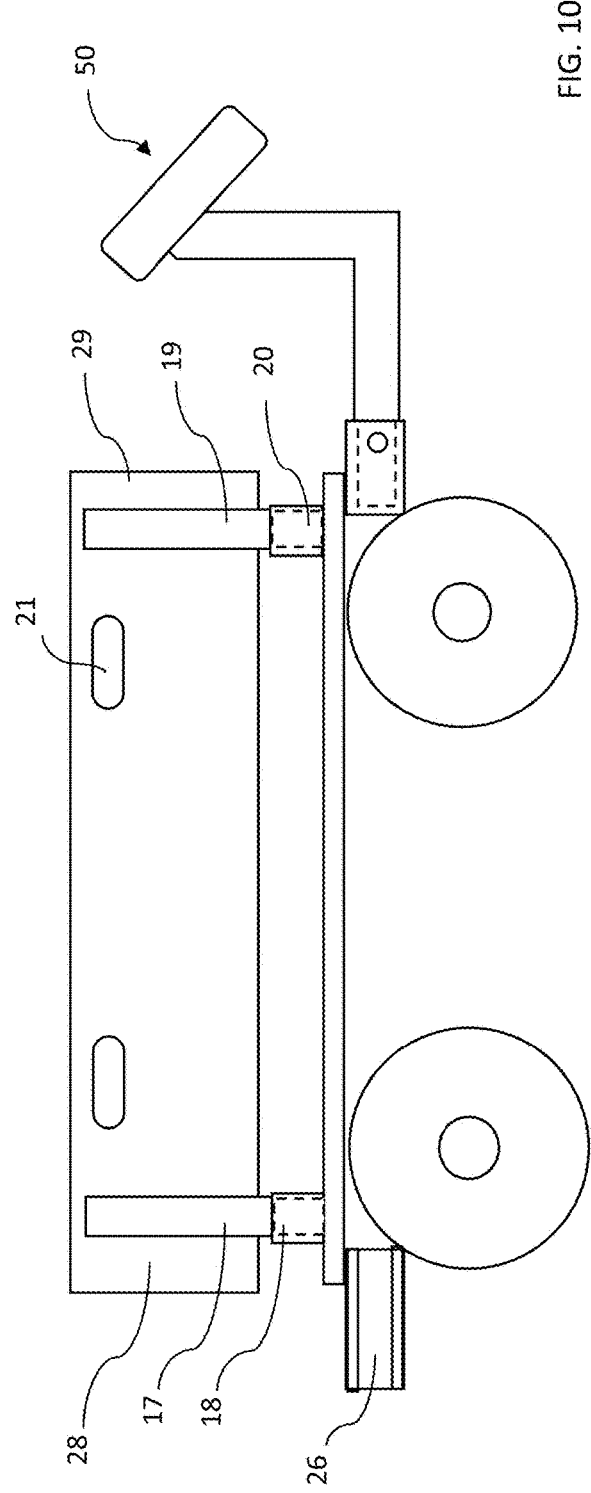
FIG. 10 is a side view of the rear cradle of the second embodiment of a turf roll mover.
Figure 13:
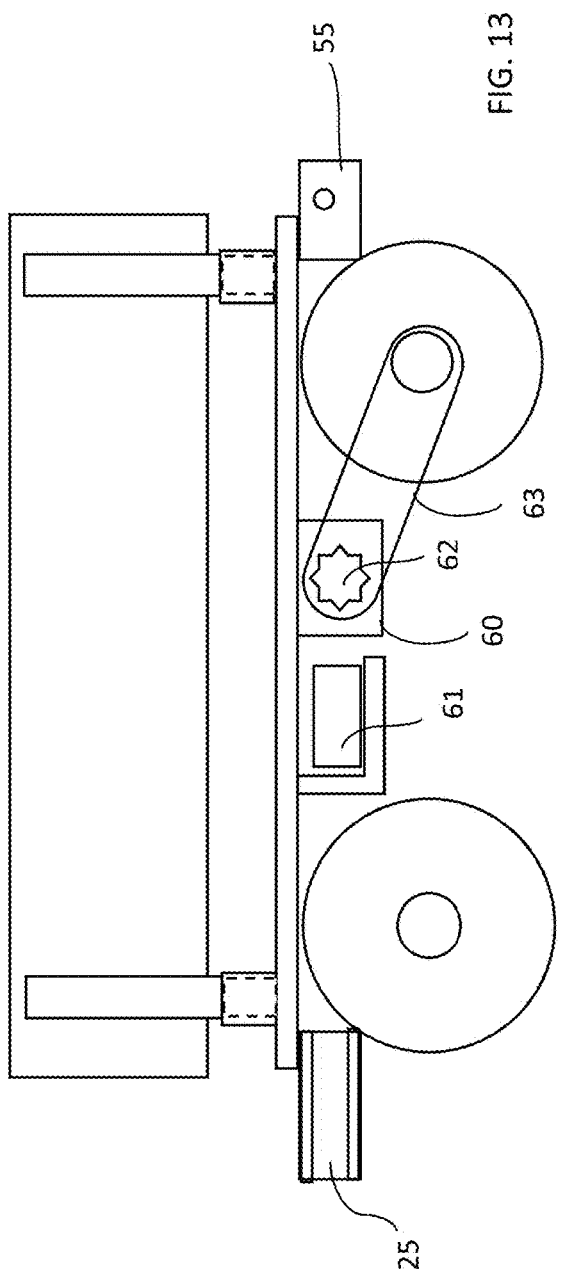
FIG. 13 is a side view of the rear cradle of the second embodiment of a turf roll mover with a motor.
Figure 14:
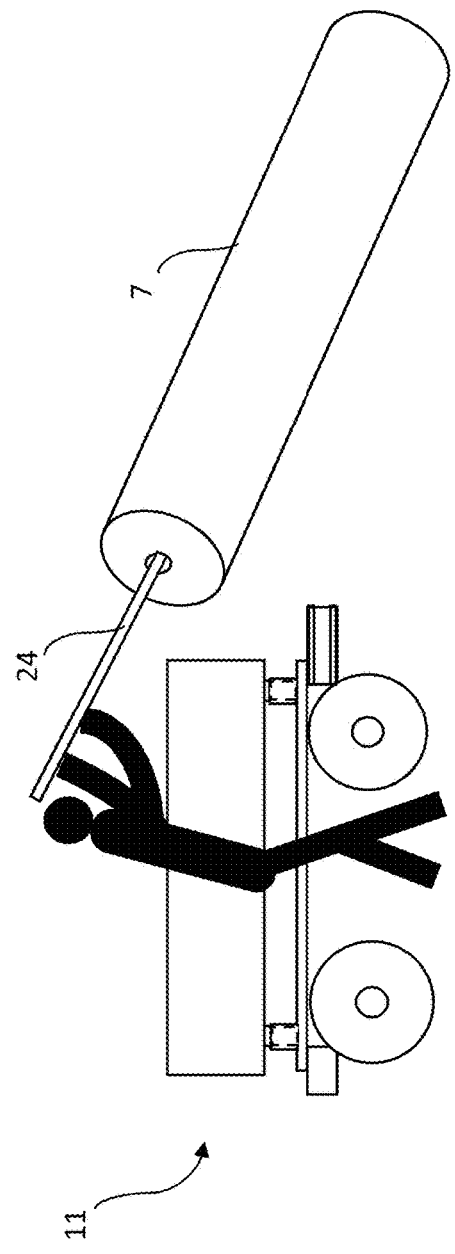
FIG. 14 illustrates a person using the connector bar to lift one end of the turf roll onto the front cradle.

The rear cradle 12 has rear connector bar receiver 26 on its front end and optionally a push bar receiver 55 on its rear end. The push bar receiver 55 is configured to receive an optional push bar 50. In one embodiment, as shown in FIG. 2, the push bar 50 has a push bar 51 and an L-shaped neck 52 that fits into the push bar receiver 55. In another embodiment a shown in FIG. 4, the neck 52 of the push bar extends vertically, forming a T-shaped push bar 50. The push bar 50 is held in place with a fastener that allows the push bar 50 to be easily removed, such as a cotter pin that fits into a hole 37 in the push bar receiver 55.

The connector bar 24 is configured to easily connect and disconnect the front and rear cradles and to be easily removable from the connector bar receivers 25, 26. In a preferred embodiment, each connector bar receiver is c-channel steel tubing, with the open side facing to the side. See FIGS. 3, 4, 7 and 8. This c-channel configuration enables the connector bar 24 to be placed into the connector bar receivers 25, 26 from the side under the turf roll 7, while the turf roll is loaded onto the mover 10. In other configurations, the connector bar receivers 25, 26 may be only open on one side for a portion and enclosed on all sides for the remaining portion, so that the connector bar 24 is more securely installed in the connector bar receivers. Optionally, the connector bar 24 is held in place in each connector bar receiver with a fastener that allows the connector bar 24 to be easily removed, such as a bolt 38 that fits into a hole in the connector bar receiver. The connector bar 24 serves two purposes: it is used as a lever to lift the turf roll 7 onto the turf roll mover 10 and it temporarily connects the front cradle 11 to the rear cradle 12 to move the turf roll to a desired location.

The tires 34 on the wheels 32 are preferably filled with air or a microcellular polyurethane foam, to be somewhat deformable as opposed to a non-deformable solid, so that the tires accommodate rocky ground to help stabilize the load and avoid disturbing decorative rocks that may serve as ground cover. An added benefit of foam-filled tires is that they do not go flat like air-filled tires. The tires preferably have a knobby tread, like that seen on off-road tires, suited for driving over gravel and dirt with relatively low friction. Narrow, smooth tread, and solid tires are unsuited for driving over ground because they sink in to the ground or decorative rocks due to the heavy weight of the turf roll: the increased friction makes it hard to roll the turf roll mover. In a preferred embodiment, the tires are Pemco Never-Flat™ PF tires available commercially at colsongroup.com, the specifications for which are incorporated herein by reference.

Each tire 34 is attached to a wheel 32. In some embodiments, at least the front wheels on the front cradle can turn relative to the base so that the front cradle can be steered in a desired direction. In other embodiments, all wheels on both cradles can turn relative to the base. The wheels may be permanently attached to the base 14 for increased stability of the base when loaded with the turf roll, or the wheels may be removably attached to the base so they can be disassembled to further reduce the size of the carrier needed to haul the disassembled parts of the turf roll mover.

Figure 15:
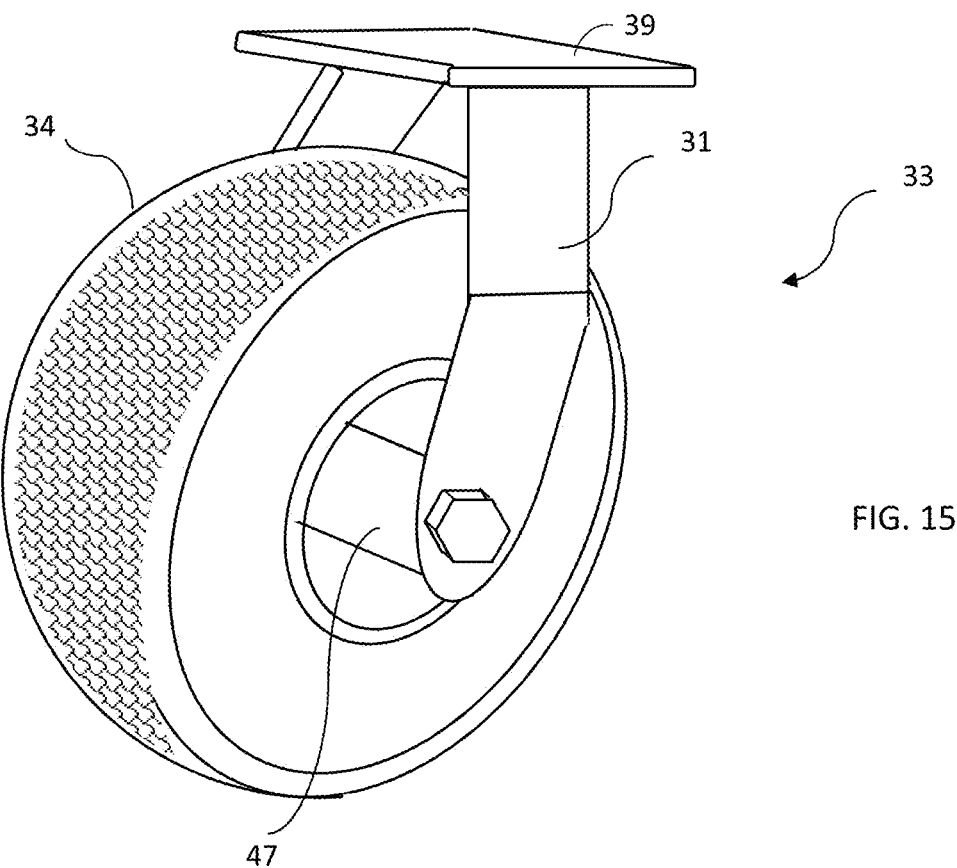
FIG. 15 illustrates a caster.
Figure 16:
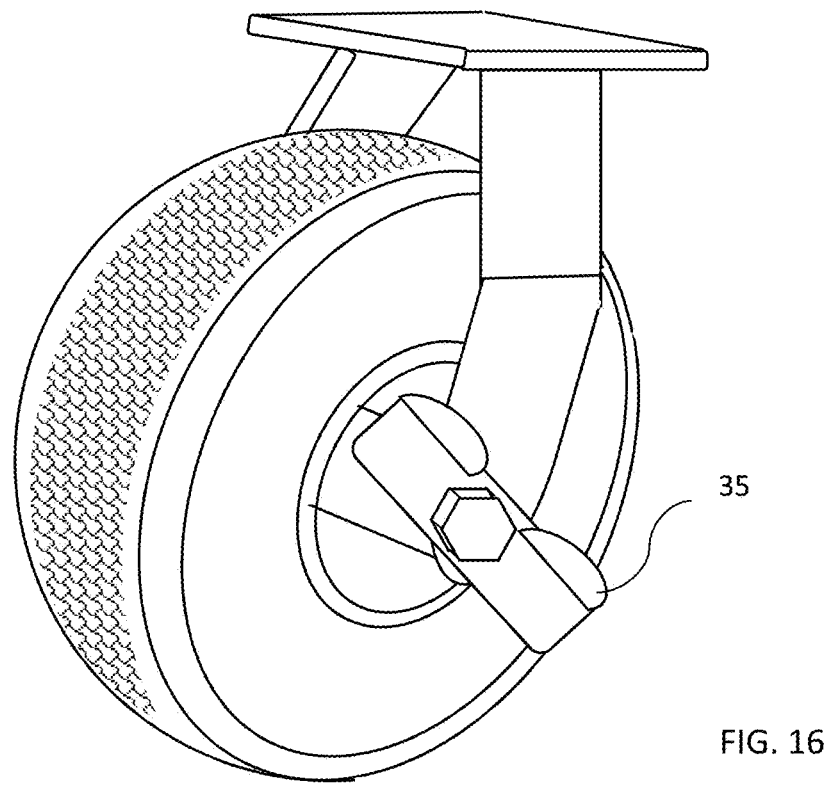
FIG. 16 illustrates a caster with a cam brake.

Wheels 32 may be individually attached to the base 14 as casters 33. For each caster, a top plate 39 of the caster 33 is attached to the base 14. Preferably each caster is attached to the base with a single fastener, such as a bolt, which makes it easier and less time consuming to remove and replace the wheels. From the top plate 39 a fork 31 extends down on both sides of the wheel 32. The fork 31 holds a fork axle 47 that the wheel rotates about. See FIG. 15. Preferably the caster is a swivel caster with zerk fitting and a sealed ball-bearing raceway. A caster may have a cam brake 35, such as that shown in FIG. 16. In other embodiments, the wheels are attached in pairs to axles 30, and the axles 30 are attached to the base 14 with struts. See FIGS. 9-14.

The turf roll mover 10 can be disassembled into its constituent parts, namely the cradles, side panels, handles, connector bar and, optionally, wheels. These disassembled parts are easily stacked in a pick-up truck bed or trailer pulled behind a pickup.

In practice, the turf roll is delivered to a residence front yard or commercial parking lot using heavy equipment and the disassembled turf roll mover is delivered using pick-up trucks and other personal-sized equipment. The turf installers assemble the turf roll mover, load the turf roll onto it, and move the roll to the backyard or patio area. Once the turf roll is moved into place, the turf roll mover can be disassembled and packed into the pickup truck bed or trailer.

To move the turf roll 7 onto the mover 10, the connector bar 24 is inserted into the core 8 on a front spiral end of the turf roll 7. See FIG. 14. The core 8 can be a hollow that remains because the turf roll has not been wound tightly or it can be the hollow inside of a reeling core such as a cardboard tube. If necessary, a core 8 can be created in a tightly wound turf roll by wedging the end of the connector bar 24 between layers of the material on the roll 7 to separate them. The connector bar 24 is then used by a person as a lever to lift that end from the ground onto the front cradle 11, leaving the other end of the turf roll 7 on the ground. The connector bar 24 is removed from that now-loaded front spiral end and inserted into the core 8 on the other spiral end of the turf roll. The connector bar 24 is again used by a person as a lever to lift that rear end of the turf roll from the ground onto the rear cradle 12. Once the turf roll 7 is loaded onto the cradles, the connector bar 24 is put into the connector bar receivers 25, 26 to connect the front cradle 11 to the rear cradle 12. Optionally the connector bar is secured into the front connector bar receiver and the rear connector bar receiver using a fastener 36, such as a cotter pin. The side supports are put into place on the base 14 to keep the turf roll on the cradles while the turf roll is moved to the desired location. Optionally the turf roll can be secured to the cradles with a strap or bungee cord 70.

The turf roll 7 is rolled to a desired location using the mover 10. Leading with the first end of the turf roll, the loaded, connected cradles are rolled by manually by pulling the loaded mover from its front or pushing it from the rear, using the handles 40, 50 if installed.

Alternatively, a motor 60 can be used to drive the wheels on the rear cradle. See FIG. 13. The motor 60 is preferably battery powered so that is has little maintenance compared to a gas-powered motor. The battery 61 is preferably a marine battery to provide sufficient torque to move the heavy turf roll. The battery may be charged by mains, a car battery, or solar panels. A gear 62 on the motor 60 is connected to one or more rear wheels 32 with one or more drive chains 63. When the motor is turned on, the drive chain turns the wheels, propelling the mover 10 forward.

Because the spiral end of turf roll 7 is at the leading end of the mover 10, the turf roll 7 can be moved through a narrow gate in a wall 71 or fence. See FIG. 17 which shows a turf roll 7 being moved through a man gate 72 in a residential backyard. When the turf mover 10 reaches the desired location, the side supports are removed and the turf roll 7 is rolled off the mover 10 onto the ground.

The size of the cradles vary depending on various factors, but are narrow enough to fit through residential gates and, when disassembled, able to fit into a pickup truck bed or trailer pulled behind a pickup. In one embodiment, each cradle is about 4 ft wide and about 3 ft long. The connector bar 24 is about 7 ft long. The various parts of the turf roll mover are preferably made of steel to withstand the weight and motion of moving the turf roll. In a preferred embodiment, when the cradles 11, 12 are connected by the connector bar 24, the length of the mover 10 is the same as the length of a turf roll. See FIG. 8. In other embodiments, the cradles may be sized such that the turf roll extends over the ends of the mover, as shown in FIG. 2, or such that the turf roll is shorter than the mover when the cradles 11, 12 are connected by the connector bar 24.

As used herein "turf" means any flexible material such as artificial turf, carpet, linoleum, plastic, or paper.

Various versions of the turf roll mover can be made by substituting one variation of a part for another. For example, in a first embodiment shown in in FIGS. 2-8 and 17, the wheels 32 are casters individually attached to the bases, one caster at each corner of each base. The side supports are side rails 15, 16 that fit into post receivers that are on the side of each base. The first side rail 15 has a first post 17 and a second post 19 that fit into a first post receiver 18 and a second post receiver 20, respectively. Similarly, the second side rail 16 has a first post 17 and a second post 19 that fit into a first post receiver 18 and a second post receiver 20, respectively. The front pull handle 40 fits into the front handle receiver 45 and the rear push bar 50 fits into the rear receiver 55.

In a second embodiment shown in in FIGS. 9-14, the wheels 32 are attached in pairs to axles, which in turn are mounted to the cradles by struts. The side supports are side panels 28, 29 that fit into post receivers that are on the side of each base. The first side panel 28 has a first post 17 and a second post 19 that fit into a first post receiver 18 and a second post receiver 20, respectively. Similarly, the second side panel 29 has a first post 17 and a second post 19 that fit into a first post receiver 18 and a second post receiver 20, respectively, on the other side of the base 14. The side panels 28, 29 may have handles or cutouts 21 to make it easier to lift the panels.

While there has been illustrated and described what is at present considered to be the preferred embodiments of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

The invention claimed is:

1. A device for moving a turf roll end first, the turf roll having a first end, a second end, and a core, the device comprising:
   a. a front cradle comprising a plurality of front wheels connected to a front base, wherein the front base comprises a frame that is horizontal and rectangular to receive the turf roll;
   b. a rear cradle comprising a plurality of rear wheels;
   c. a removable connector bar wherein the removable connector bar is configured to:
      i. be insertable into the turf roll at the first end of the roll of material and lever the first end of the turf roll onto the front cradle; and
      ii. connect the front and rear cradles.

2. The device for moving a turf roll of claim 1 wherein:
   a. the front cradle has a front connector receiver;
   b. the rear cradle has a rear connector receiver; and
   c. the removable connector bar rests in the front connector receiver and rear connector receiver to connect the front cradle and rear cradles.

3. The device for moving a turf roll of claim 1 further comprising one or more front side supports attached to the front cradle and one or more rear side supports attached to the rear cradle.

4. The device for moving a turf roll of claim 3 wherein the side supports are removable.

5. The device for moving a turf roll of claim 1 wherein:
   a. the front cradle has pull handle; and
   b. the rear cradle has a push bar.

6. The device for moving a turf roll of claim 1 wherein each wheel of the plurality of front wheels is a swivel caster.

7. The device for moving a turf roll of claim 1 wherein each wheel of the plurality of front wheels is attached to the front cradle with a single fastener.

8. The device for moving a turf roll of claim 1 wherein each wheel of the plurality of front wheels further comprises a tire that is deformable.

9. The device for moving a turf roll of claim 8 wherein each tire has a knobby tread.

10. The device of claim 1 further comprising a battery-powered motor connected to one or more of the plurality of rear wheels.

11. A device for moving a turf roll end first, the turf roll having a first end, a second end, and a core, the device comprising:
   a. a front cradle comprising a front base, four front post receivers, four front wheels, and a front connector receiver, wherein the front base comprises a frame that is horizontal and rectangular to receive the turf roll;
   b. a rear cradle comprising a rear base, four rear post receivers, four rear wheels, and a rear connector receiver;
   c. a connector bar adapted to removably fit in the front connector receiver and rear connector receiver which thereby connects the front and rear cradles.

12. The device of claim 11 wherein the rear cradle further comprises a rear push bar removably connected to the rear base.

13. The device of claim 12 wherein the front cradle further comprises a front pull handle removably connected to the front base.

14. The device of claim 11 further comprising:
   a. a first front side support comprising a first front post and a second front post, wherein the first front post and second front post are removably seated in two of the four front post receivers; and
   b. a first rear side support comprising a first rear post and a second rear post, wherein the first rear post and second rear post are removably seated in two of the four rear post receivers.

15. The device of claim 11 wherein the front base is covered with a steel mesh.

16. The device of claim 11 further comprising a battery-powered motor connected to one or more of the four rear wheels.

17. A method for moving a turf roll end first, the turf roll having a first end, a second end, and a core, the method comprising:
   a. at the first end of the turf roll, inserting a connector bar into the core;
   b. lifting the first end of the turf roll using the connector bar and loading the first end of the turf roll onto a front cradle comprising:
      i. a frame that is horizontal and rectangular;
      ii. a front connector receiver; and
      iii. one or more wheels;
   c. at the second end of the turf roll, inserting the connector bar into the core;
   d. lifting the second end of the turf roll using the connector bar and loading the second end of the turf roll onto a rear cradle comprising a rear connector receiver and one or more wheels;
   e. connecting the front and rear cradles by placing the connector bar into the front connector receiver and the rear connector receiver; and
   f. leading with the first end of the turf roll, rolling the connected front and rear cradles to a desired location.

18. The method of claim 17 further comprising securing the connector bar into the front connector receiver and the rear connector receiver.

19. The method of claim 18 further comprising attaching a removable side railing or side panel to the front cradle after the turf roll is loaded onto the front cradle.

20. The method of claim 19 further comprising:
   a. unloading the turf roll from the connected front and rear cradles;
   b. removing the side railing or side panel from the front cradle;
   c. removing the connector bar from the front and rear cradles; and
   d. loading the front and rear cradles, the side railing or side panel, and the connector bar into a pickup truck bed or trailer.

* * * * *